H. L. THOMAS.
NUT LOCK.
APPLICATION FILED DEC. 22, 1919.
1,372,376.
Patented Mar. 22, 1921.
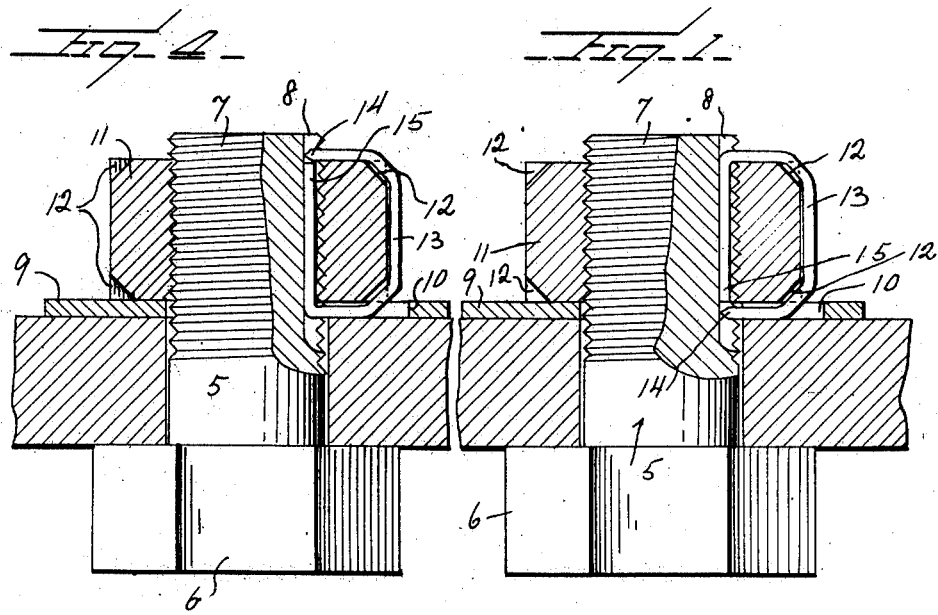
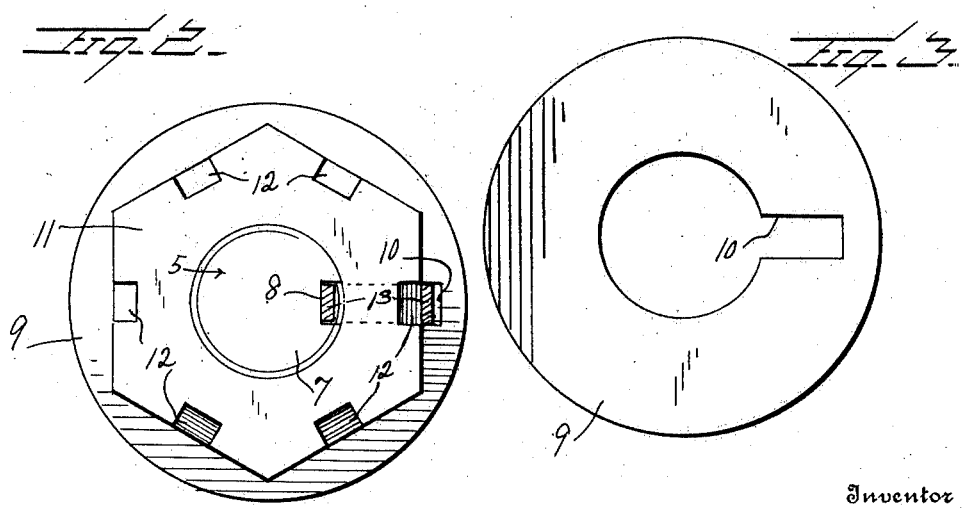
Inventor
H. L. Thomas
By Watson E. Coleman
Attorney

UNITED STATES PATENT OFFICE.

HARRY L. THOMAS, OF WASHINGTON, PENNSYLVANIA.

NUT-LOCK.

1,372,376.   Specification of Letters Patent.   Patented Mar. 22, 1921.

Application filed December 22, 1919. Serial No. 346,469.

*To all whom it may concern:*

Be it known that I, HARRY L. THOMAS, citizen of the United States, residing at Washington, in the county of Washington and State of Pennsylvania, have invented certain new and useful Improvements in Nut-Locks, of which the following is a specification, reference being had to the accompanying drawings.

This invention relates to nut locks and has for its object to provide a nut lock which can be securely locked at any point on the bolt.

Another object is to provide a nut lock of this character wherein the bolt and nut have grooves in their outer surfaces parallel to each other for the reception of a single locking key.

Another object is to provide a nut lock of this character including a shank having a recess in its inner marginal edge for the reception of a portion of the locking key when the latter is applied to the nut and bolt, to relieve the key of the pressure of the secured nut.

Another object is to provide a nut lock of this character including a locking pin capable of performing two separate and distinct locking operations.

A still further object is to provide a nut lock of this character which can be locked by one or two methods, and including a novel washer which in addition to relieving the locking pin of pressure, locks one end of the pin in a recess therein, in one of the locking methods.

With these and other objects in view the invention consists of the improved construction to be hereinafter more particularly described, fully claimed and illustrated in the accompanying drawing in which:

Figure 1 is a vertical section of the invention applied to a bolt, and showing one of the methods of locking.

Fig. 2 is a plan view.

Fig. 3 is a detail view of the washer.

Fig. 4 is a vertical section showing another locking method.

The invention consists of a bolt 5 having a head 6 and a threaded shank 7. A groove 8 is provided in the shank 7 and extends longitudinally thereof. This groove is intended to receive both ends of a locking pin to be hereinafter described.

A washer 9 is intended to be disposed on the bolt and in engagement with the object through which the bolt is passed. The inner marginal edge of the washer formed by the center opening thereof is provided with a recess 10, the purpose of which will be hereinafter explained. Threaded on the bolt, is a nut 11, one end of said nut being arranged to engage the washer 9. A plurality of the spaced canted grooves 12 are formed in the periphery of the nut, and extend in angular relation to the groove 8 of the shank 7.

In order to secure the nut to the bolt a locking pin 13 is provided. This pin consists of an elongated member having a tapered end 14 and a flat end 15, and is capable of being applied in two ways each of which firmly locks the nut. The first method of locking consists of placing the washer on the bolt in engagement with the object to be secured and rotating the nut firmly in engagement with the washer. The end portion 15 of the pin is then inserted in the groove 8, between the bolt and the inner surface of the nut. The remainder of the pin is then bent over the outer surface of the nut and through one of the peripheral grooves 12, into the recess 10 of the washer and the portion of the groove 8 with which the recess 10 registers. By this means the end of the recess 10 engages the inwardly extending portion of the pin and prevents disengagement thereof from the nut. It is of course obvious that the washer 9 is slightly thicker than the pin 13 so that the portion of the key within the recess 10 does not receive the pressure of the secured nut, and at the same time is held from disengagement from the bolt by the washer. The other method of locking consists of placing the end portion 15 of the pin 13 in the groove 8 and recess of the washer 10. The nut 11 is then applied and rotated into engagement with the washer 9. The end portion 14 of the pin is then passed over the nut into one of the peripheral grooves 12 and then extended inwardly into the groove 8 in right angular relation to the longitudinal axis of the portion 15. In both locking methods, the pin entirely surrounds a portion of the nut.

From the foregoing it will be readily seen that this invention provides a simple and effective nut lock which can be locked at any point longitudinally of the bolt. In addition to this it includes a novel form of washer which not only prevents the nut from injuring the object through which the bolt passes, but prevents the nut from applying pressure to the pin, and also serves to retain the pin in engagement with the nut. The locking pin when applied forms substantially a ring around one portion of the nut, both ends of the pin being disposed within the groove of the bolt so that they are protected in their locking operation.

What is claimed is:—

A nut lock comprising a longitudinally grooved bolt, a washer mounted on said bolt and provided with a recess communicating with the central opening thereof adapted to be alined with the groove of the bolt, a nut threaded on said bolt and having spaced canted recesses formed in its outer edges, the recesses of one end inclining toward and substantially registering with recesses of the other end face, and a pin embodying a portion abutting a facet of the nut and having portions extending through two of the alined recesses, the upper end portion of the pin contacting the upper face of the nut and having its terminus disposed within the groove of said bolt, the lower end portion of the pin extending through the recess of said washer and having its terminus likewise disposed in said groove.

In testimony whereof I hereunto affix my signature.

HARRY L. THOMAS.